A. UHLYARIK.
RADIATOR FOR MOTOR VEHICLES AND THE LIKE.
APPLICATION FILED MAR. 24, 1913.
1,121,541.
Patented Dec. 15, 1914.
3 SHEETS—SHEET 1.
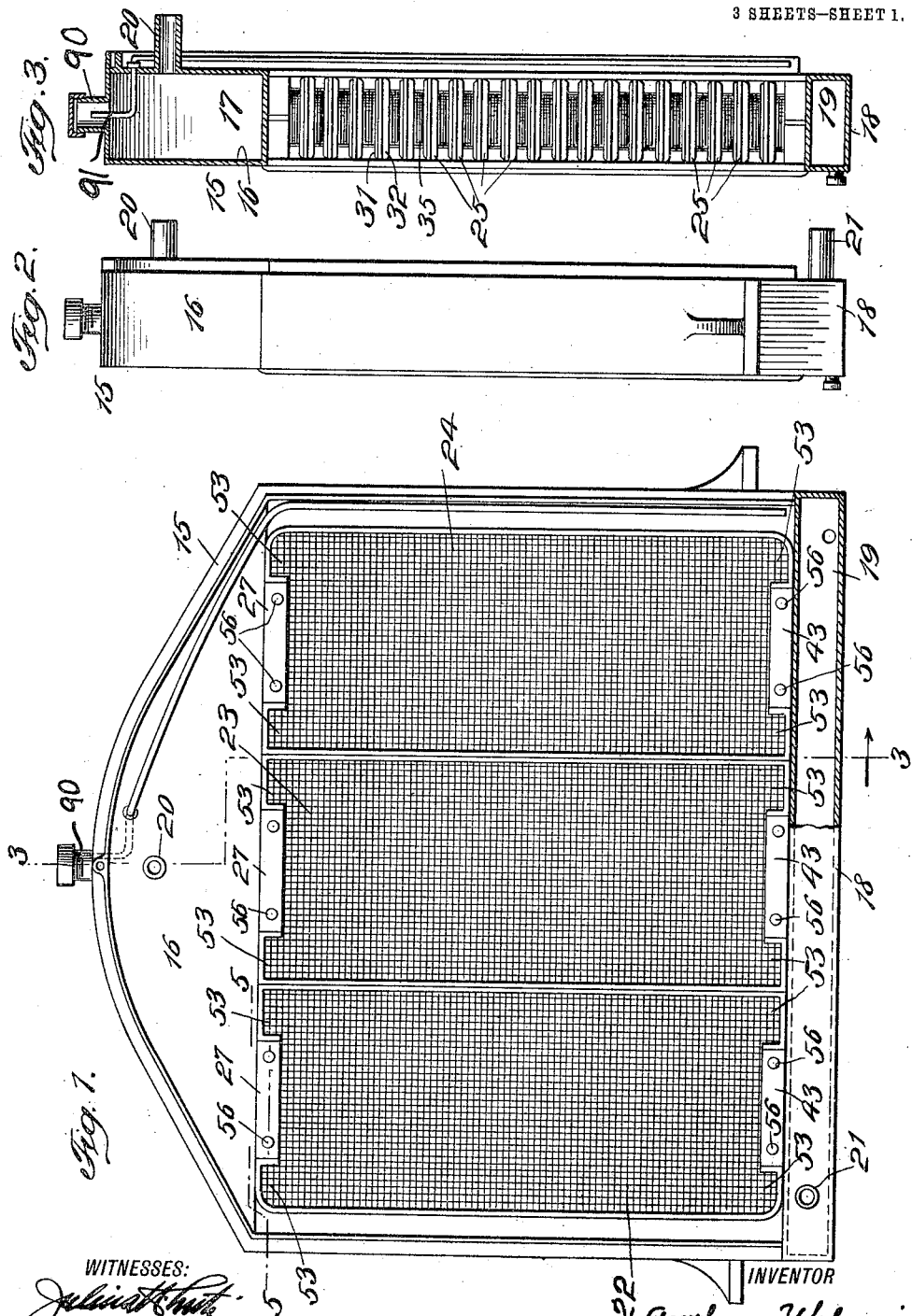

A. UHLYARIK.
RADIATOR FOR MOTOR VEHICLES AND THE LIKE.
APPLICATION FILED MAR. 24, 1913.
1,121,541.
Patented Dec. 15, 1914.
3 SHEETS—SHEET 2.
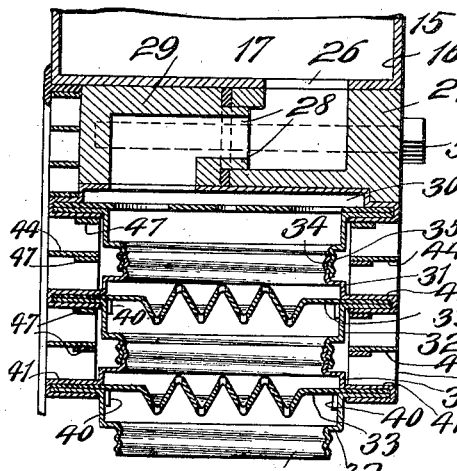
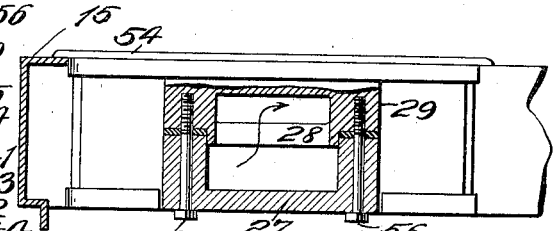
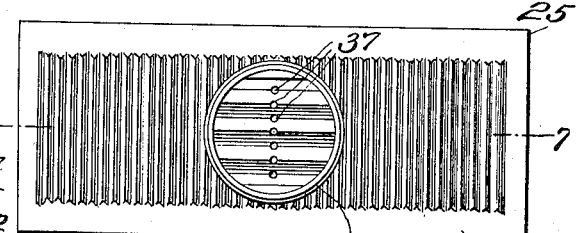
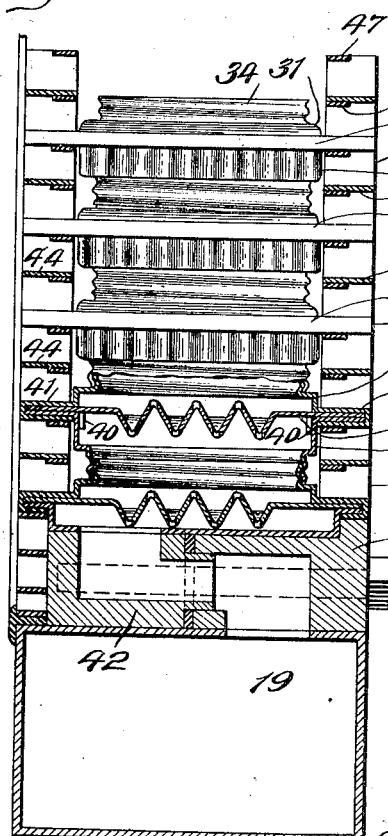
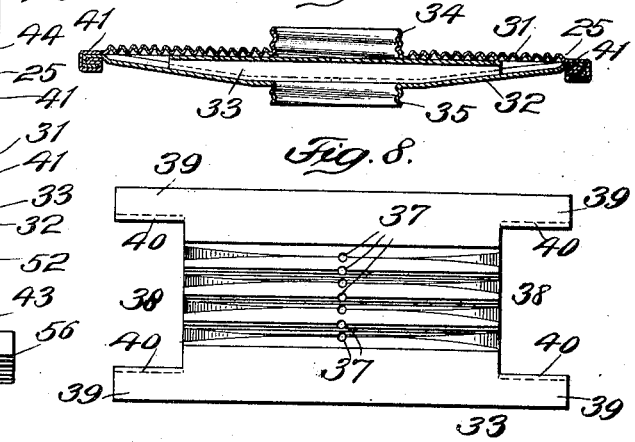

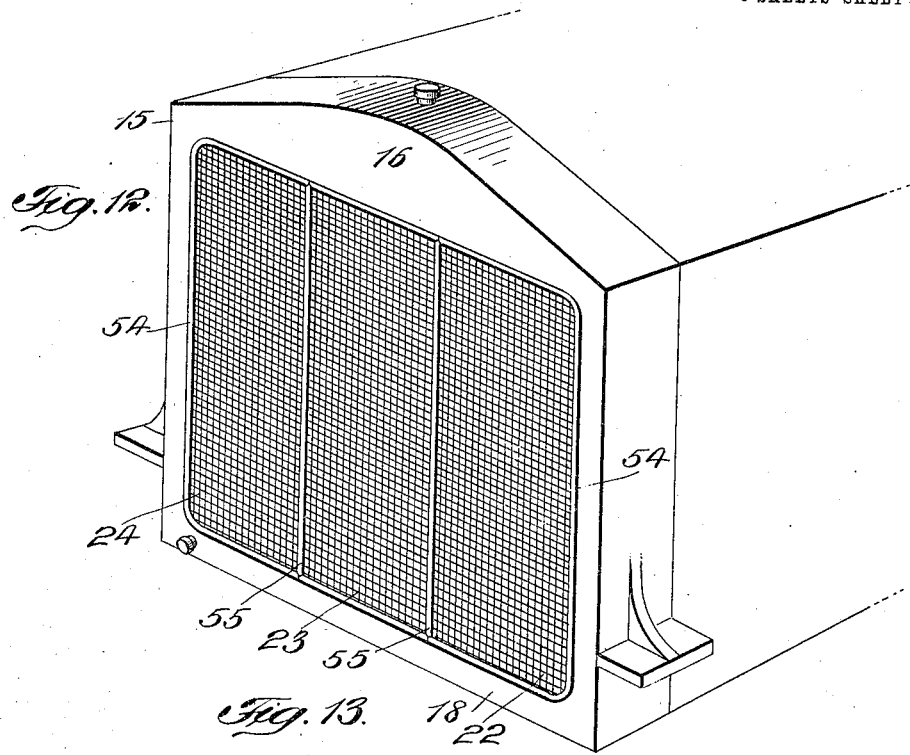
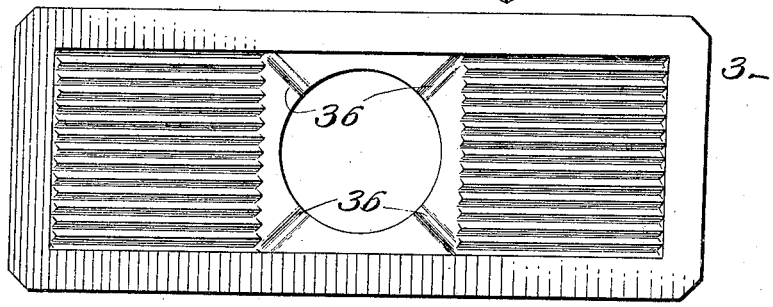
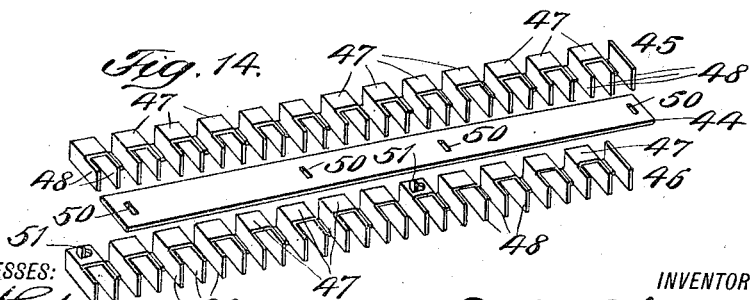

UNITED STATES PATENT OFFICE.

ANTHONY UHLYARIK, OF NEW YORK, N. Y.

RADIATOR FOR MOTOR-VEHICLES AND THE LIKE.

1,121,541. Specification of Letters Patent. Patented Dec. 15, 1914.

Application filed March 24, 1913. Serial No. 756,406.

*To all whom it may concern:*

Be it known that I, ANTHONY UHLYARIK, a subject of the King of Hungary, and a resident of New York city, in the county of New York and State of New York, have invented certain new and useful Improvements in Radiators for Motor-Vehicles and the like, of which the following is a specification.

The invention relates to improvements in radiators of the character employed on motor vehicles, automobiles and the like, for cooling the water which circulates in jackets surrounding the cylinders; and the object of the invention is to provide a radiator of this class of very greatly increased efficiency and durability and one which may be readily manufactured at minimum expense.

A further object of the invention is to provide a radiator which may be readily repaired in case of injury and which is composed of independently operable units, any one or more of which may be removed and the radiator continue in operation with the remaining units.

The radiator of my invention comprises an exterior casing for the admission and escape of the circulating water, and a series of units mounted therein, each composed of a series or bank of hollow intercommunicating radiator sections through which the water must circulate and which afford maximum cooling surfaces for the water to engage, and a series of fins interposed between the opposite edges of said radiator sections and rigid therewith and imparting strength and efficiency to the unit as a whole. The units are removably secured in position and are independent of one another, and any one may continue in operation should the others become damaged. The radiator sections of a unit lie horizontally one above another and are provided at the center of their upper and lower sides with threaded nozzles by which the sections may be screwed to one another to form a bank thereof, preparatory to receiving between their opposite side edges the fins which fill the spaces between said edges and are secured, preferably by soldering, to said sections.

The invention will be fully understood from the detailed description hereinafter presented, reference being had to the accompanying drawings, in which:

Figure 1 is a rear elevation, partly broken away and partly in section, of a radiator constructed in accordance with and embodying my invention; Fig. 2 is a side view of the same, taken from the right hand side of Fig. 1; Fig. 3 is a vertical section through the same on the dotted line 3—3 of Fig. 1; Fig. 4 is an enlarged transverse section, partly broken away, through the radiator, with some of the radiator sections shown in edge elevation and some in section; Fig. 5 is a horizontal section through a portion of the radiator on the dotted line 5—5 of Fig. 1; Fig. 6 is a detached top view of one of the radiator sections; Fig. 7 is a vertical section through the same on the dotted line 7—7 of Fig. 6; Fig. 8 is a detached top view of a plate confined within each of the radiator sections, as shown in Figs. 6 and 7; Fig. 9 is an end view of the same; Fig. 10 is a side elevation of a portion of one of the fins which are interposed between the side edges of the several radiator sections and which are diagrammatically represented by the cross lines in Figs. 1 and 12; Fig. 11 is a vertical section through the same on the dotted line 11—11 of Fig. 10; Fig. 12 is a perspective view showing the front of the radiator and its location on the vehicle; Fig. 13 is a detached top view of the bottom member of one of the individual radiator sections, this figure showing the flange portion of said member in its flat condition or before it is seamed to the upper member of the section in the manner shown in Fig. 7, and Fig. 14 in a perspective view illustrates the three members of the fins in their disassembled relation, but ready to be assembled in the relation they usually bear to each other when ready to be placed between the edges of the sections of the radiator units.

In the drawings 15 designates the exterior frame or casing of the radiator, and this casing will be of any suitable or desired or required outline in accordance with the nature of the vehicle to which it is to be applied. The form of the radiator casing 15 illustrated in the drawings is a desirable one for use on the bonnet or chassis of a motor vehicle, and said casing 15 comprises an upper transverse portion 16 within which is formed a chamber 17 extending transversely across the radiator and a lower transverse portion 18 within which is formed a chamber 19 extending transversely across the lower portion of the radiator, said portion 16 being equipped with an inlet 20 for the water to be cooled and the portion 18 with an outlet 21 for the cooled water. Within the casing 15 I provide as many units of my radiator system as may be required, and in the present instance I illustrate three of said units numbered generally 22, 23, 24, respectively, each unit being a duplicate of each other unit and composed of a vertical series of communicating radiator sections 25 arranged horizontally one above another and all corresponding and communicating with one another. The units 22, 23, 24 are set in between the upper and lower portions 16, 18 of the radiator casing 15 and all of said units communicate at their ends with the chambers 17, 19, and any one of said units may be detached if required without interfering with the operation of the remaining units. The portion 16 of the outer casing is formed at each of the units 22, 23, 24 with an opening 26 in the rear portion of its bottom, and this opening leads into a transverse box-like member 27 secured to the underside of the upper portion 16 of said casing 15 and having an opening at its forward side adapted to receive the reduced end portion 28 of a box-like member 29 carried by the unit member of the radiator and being hollow and at its rear end communicating with the box-like member 27 and at its lower side opening into an upper chamber-section 30 at the top of the series of radiator sections 25, the top of said section 30 fitting against the lower surfaces of the box-like members 27, 29, and substantially conforming in dimensions with the sections 25. We may call the section 30 the inlet section to the unit of radiator sections 25, and said section 30 and also the box-like member 29 form a part of and are secured to said unit.

The sections 25 of each unit are illustrated in detail in Figs. 6, 7, 8, 9 and 13, and in their connected relation in Figs. 3 and 4, and on reference to Figs. 6, 7, 8, 9 and 13, it will be seen that each section 25 comprises an upper plate 31, a lower plate 32, and an intermediate plate 33, and that the plates 31, 32 are respectively formed with central threaded pipe sections 34, 35, these pipe sections being utilized for the passage of the water from one section 25 to another and also for connecting the sections together in series, as indicated in Figs. 3 and 4.

The plate 31 of each section 25 is preferably transversely corrugated, as shown more clearly in Figs. 6 and 7, and the lower plate 32 of each section inclines downwardly from its edges toward the pipe section 35, and said plate is preferably longitudinally corrugated at each side of said pipe section 35 as shown more clearly in Figs. 4, 7 and 13, said longitudinal corrugations forming gutters or grooves extending from the ends of the plate to the pipe section 35 and the purpose of which is to increase the strength of the plate, cause the plate to have maximum cooling surfaces and permit the plate to assuredly conduct the water which enters the section to the outlet therefrom. At the central portion of the upper surface of the lower plate 32 of each section is a substantially flat rectangular surface, as shown in Fig. 13, and four corrugations 36 extending radially from the outlet opening toward the outer side edges of the plate. Each section 25 is provided with the intermediate plate 33 which extends transversely between the sides and ends of the section and is preferably corrugated longitudinally, as shown in Figs. 8 and 9, and provided at the upper and lower edges of said corrugations with vent openings 37, which permit the escape of air and also the downward escape of water, when the radiator is to be placed out of use, so that water will not remain within the corrugations or grooves of said plate 33, which grooves, as shown, are dished downwardly toward the central portion of the plate.

The water entering the pipe section 34 of one of the sections 25 would find a ready passage out through the pipe section 35 except that its flow is obstructed by the presence of the plate 33. The plate 33 compels the water to move laterally and escape over the ends of said plate and then return toward the center over the plate 32, thus in each of the sections 25 compelling an extended circulation of the flowing water over the corrugated surfaces afforded by the plates 31, 32, 33. The plate 33 does not in its main body portion extend to the extreme outer ends of the plate 32, and hence spaces 38 (Fig. 8) are provided at the ends of the plate 33 through which the water may, passing over the ends of said plate, flow upon and down the plate 32. At its ends the plate 33 is formed with outwardly projecting end members 39 whose facing edges are turned downwardly, as at 40 (Figs. 8 and 9), to form feet or flanges adapted to engage the upper surface of the lower plate 32 and afford a support for the plate 33 as well as to aid in securing said plate 33 in position between the plates 31, 32. The lower edges of the flanges or feet 40 enter the corrugations in the lower plate 32 and aid in centering the plate 33, which is held down upon the plate 32 by the plate 31. The flanges or feet 40 also come close to the vertical side edges of the lower plate 32, which is of dish formation, as shown in Fig. 4, and aid in the proper assembling of the several plates of each section 25 and in their being suitably secured together.

The plates 31, 32, 33 are seamed together at their edges, the plate 31 being formed on its outer portion with a flat encompassing edge portion 41 to lap upon and around the side edges of the plate 33 and plate 32, as represented in the sectional portions of Fig. 4, each section 25 at its side edges thus being comprised of four layers of metal, one layer being the edge portions of the plate 33, another layer the edge portions of the plate 32, and the other two layers being formed of the portions 41 of the plate 31, folded around the edges of the plates 32, 33. At their adjoining end portions the plates 31, 32 are given a second fold or bend into a double seam, as shown in Fig. 7, it being desirable that the ends of the section 25 be somewhat stiffer than the side edges of said section. It is necessary that the sections 25 each be liquid-tight, with the exception of their communication with one another at the pipe sections 34, 35.

The sections 25 are connected together in series at the nozzles 34, 35, one section being screwed upon another until a vertical column or unit of as many of said sections as it may be desired to use shall be formed, said sections then standing in the relation illustrated in Figs. 3 and 4.

At the lower end of each unit of sections 25 is secured a box-like member 42, which affords the outlet from the unit of sections and has communication with a box-like member 43 secured upon the lower portion 18 of the general exterior casing 15 and communicating with the chamber 19 therein.

Between the longer or front and rear side edges of the radiator sections 25 when the latter are arranged as a unit, I provide fins of the character shown in Figs. 4, 10, 11 and 14, these fins each comprising a central bar or flat piece of metal 44 and two corresponding strips or pieces of metal 45, 46 corrugated on angular lines transversely throughout their length and secured to the opposite sides of the bar 44. The strips or pieces 45, 46 are of special formation, illustrated more clearly in Figs. 10, 11 and 14, in that each corrugation of each strip is formed of an upper flat portion 47, and two side portions 48, which are vertical or stand on edge and are parallel with each other, and are closed over at their upper edges by the flat portion 47 which extends from the inner edge of the strip outwardly to about one-half of the length of the sides 48, thereby leaving about one-half of the space between the sides 48 uncovered, while the remaining half of said space is covered by the flat portion 47. Each of the corrugations of the strips 45, 46 is connected with the adjacent corrugations by flat portions 49 of the metal of the strip, which parts 49 correspond exactly in form and extent with the upper flat portions 47 and are simply the reverse thereof and engage, in respect to the corrugated strip 45, the upper surface of the plate 44. I preferably at first rivet the three pieces 44, 45, 46 together at distant points, as at the holes 50 in the strip 44, as a convenience in assembling the parts of each unit fin. This riveting of the pieces 44, 45, 46 may be conveniently accomplished by forming the holes 50 in the piece 44 and lips 51 in the strips 45, 46 to enter said holes and be turned laterally against the strip 44. After the several sections 25 have been secured together to form the unit, the fins, which I will number 52 as a whole, are pushed between the side edge flanges of said sections, said fins tightly fitting between the said flanges and serving to stiffen the unit of sections 25 and transform the same into a rectangular member having the exposed fins 52 at each side and said fins substantially concealing the said sections 25, front and rear, with the exception of the exposure of the side edge flanges of said sections between said fins, as shown in Fig. 4. After the fins 52 and series of sections 25 have been assembled, it is necessary that they should be secured together and that all of the joints between the nozzles 34, 35 of the several sections 25 shall be rendered water-tight, and to accomplish these purposes at a single operation, I place the unit of sections 25 having the fins 52 in position in a frame and immerse the unit into a bath of solder, which will coat over the fins and the sections 25 and unite these parts together, and at the same time seal all of the joints about the pipe sections 34, 35 and along the edges of the sections 25 and thus leave the unit of sections 25 and fins 52 as though they were in one integral rigid piece. I, of course, upon removing the unit from the solder bath jar it slightly to remove any surplus solder therefrom.

At the ends of each of the box-like members or sections 27, 43 carried by the main casing 15, I build out the units 22, 23, 24 with additional fins 53 so as to improve the appearance of the structure, and at the front of the vehicle present a uniform front face of fins and conceal the box sections 27, 29, 42, 43 as nearly as may be.

Each of the units 22, 23, 24 besides comprising the series of sections 25, interposed fins 52 and inlet and outlet box-like sections 29, 42 will be provided with a flange 54 on its edges (Fig. 12), this flange being carried by the units and engaging the front surface of a main radiator casing 15. The flange 54 on the two end units extending along the upper and lower and outer side edges thereof and seats against the casing 15. The middle unit member will have the flange at its upper and lower edges to seat against the main casing 15, and in addition I will provide corresponding strips or flanges to overlap the joint between the end and middle unit members, as shown at 55 in Fig. 12. The flanges 55 may be secured to the middle unit member and lap upon the end members or to the end members and lap upon the middle member.

The units will be applied to the main casing 15 from the front thereof, the flanges surrounding the units seating against the front surface of said casing and the box-like sections 29, 42 of the units passing inwardly into firm engagement with the box-like sections 27, 43 carried by the casing 15, and thereupon by means of screws or bolts 56 the units and casing will be firmly secured together, said bolts or screws 56 passing through the end portions of the box-like sections 27, 43 and engaging the box-like sections 29, 42, as shown in Fig. 4.

The operation of the radiator will be largely understood from the foregoing description. The water enters the chamber 17 at the upper part of the main casing 15 and thence flows through the openings 26 and box-like sections 27, 29, to the series of radiator sections 25 and thence through said sections to the lower chamber 19. The water in passing downwardly through the sections 25 will be compelled to circulate laterally in the upper chamber of each section and thence inwardly and laterally within the lower portion of each section and contact with a maximum extent of metal. The water will flow downwardly through all of the units 22, 23, 24 and be subjected to the cooling action of very extended surfaces. The fins 52 between the opposite edges of the radiator sections 25 permit the entrance and circulation of air within the units and around and about the radiator sections 25, and said fins themselves aid in absorbing the heat from the sections 25 and giving it off to the atmosphere. I regard the special construction of the fins 52 as important in attaining the highest efficiency from the radiator.

The fact that the radiator is made up of units 22, 23, 24 of connected radiator sections 25 and fins 52, is of great importance both in economy of construction and in the durability and efficiency of the radiator, and it is also important that should any one of the units become damaged, its ceasing to operate would not interfere with the remaining units continuing in operation. If, for instance, an accident should occur that would thoroughly damage any one of the units of the radiator, such unit would be withdrawn and the outlet from the chamber 17 through the opening 26 and box-like section 27 which leads to such unit would be plugged up, and thereafter all of the remaining units could continue in operation, the water circulating therethrough as before. Any unit that might become damaged need not necessarily be withdrawn from the radiator and permanently separated therefrom, but if only partly damaged could be withdrawn sufficiently to enable the driver to plug up the opening in the chamber 17 leading thereto and then returned to position. Anyone of the units may be omitted from the radiator without interfering with the use of the remaining units, it being simply desirable under such circumstances that the box-like sections 27, 43 for the removed unit be closed.

I regard the construction of fins 52 presented herein as highly desirable, since the strips 45, 46 of said fins present flat surfaces to the radiator sections and to the intermediate strip 44 and also vertical or end-edge sides 48 to directly take any pressure exerted against the fins by the sections 25. The fins 52 of the construction presented will be found to be highly efficient and very durable, and while I regard this construction as important, I do not limit the invention in every detail to the employment of the special fins shown.

The sections 25 of the construction hereinbefore described in detail are not only highly efficient and durable in use, but also capable of resisting warping action therein when the units of sections are dipped into the hot solder bath and coated over by the ..... The coating of the units of sections by hot solder is important in closing all the joints about the individual sections 25 and connecting said sections and the fins together as a substantially integral unit, the unit thus formed being of considerable durability and resisting power and capable of being readily handled and applied to or removed from the main radiator casing, whose upper and lower chambered ends constitute headers for the several connected series or units of sections. The air which passes through the vent openings 37 in the plates 33 ascends to a small dome 90 at the top of the chamber 17 and thence escapes through a pipe 91 connecting the said dome with the open atmosphere.

What I claim as my invention and desire to secure by Letters Patent, is:

1. In a radiator comprising an exterior open frame or casing whose upper and lower parts form headers, a plurality of independent vertical radiator units insertible into said casing from the front thereof and having edge flanges to engage the same and flanges to conceal the joints between one another and each of said units comprising a series of corresponding horizontal shallow rectangular sections having chambers therein and provided on their upper and lower sides with nozzles or pipe sections connecting said sections of each unit in series and fins interposed between and engaging said sections, means set inwardly from the front of said units placing the same in independent communication with said headers, and means at the rear side of said frame or casing for independently and removably securing said units therein.

2. In a radiator comprising upper and lower casing parts forming headers, and a vertical radiator unit interposed between said headers and communicating therewith and comprising a series of horizontal shallow rectangular radiator sections having chambers therein and provided on their upper and lower sides with screw-threaded alined nozzles or pipe sections connecting said sections of the unit in series and fins interposed between and engaging the front and rear edges of said sections, each of said sections having within it means for causing a lateral flow of the water and composed of upper and lower plates having laterally extending flanges seamed together and forming flat seats for said fins.

3. In a radiator comprising upper and lower casing parts forming headers, and a removable vertical radiator unit interposed between said headers and communicating therewith and comprising a series of horizontal shallow rectangular radiator sections having chambers therein and provided on their upper and lower sides with screw-threaded alined nozzles or pipe sections connecting said sections of the unit in series, and fins interposed between and engaging the front and rear edges of said sections, each of said sections being composed of upper and lower plates having edge flanges seamed together and affording seats for said fins, and the sections and fins of the unit being coated over with solder to secure the plates of each section and the sections and fins together, whereby the unit is in effect one integral body for application to or removal from the headers.

4. A radiator comprising upper and lower casing parts forming headers, and a vertical radiator unit communicating at its ends with said headers and comprising a series of horizontal shallow rectangular radiator sections having chambers therein and provided on their upper and lower sides with nozzles connecting said sections in series, and fins, said sections each being composed of an upper corrugated plate having an encompassing edge flange, a lower downwardly dished corrugated plate having an encompassing edge flange and an interior horizontal division plate having flanges on opposite edges between the flanges on the front and rear edges of said upper and lower plates, and said flanges on said upper and lower plates being seamed together and said unit having a coating of solder securing the members of the sections and the sections and fins together and rendering the unit rigid and water-tight.

5. A radiator comprising upper and lower casing parts forming headers, and a vertical radiator unit communicating at its ends with said headers and comprising a series of horizontal shallow rectangular radiator sections having chambers therein and provided on their upper and lower sides with nozzles connecting said sections in series, and fins interposed between edge portions of said sections, said sections each being composed of an upper transversely corrugated plate whose edge portions are flanged, a lower longitudinally corrugated downwardly dished plate whose edge portions are flanged and seamed to the flange of said upper plate and an interior downwardly dished longitudinally corrugated division plate to compel a flow of the water to the ends of the section, said division plate being formed with apertures at the bottoms of its corrugations and vents at the tops thereof.

6. In a radiator comprising upper and lower casing parts forming headers, and a vertical radiator unit communicating at its ends with said headers and comprising a series of hollow horizontal shallow rectangular radiator sections in communication with one another in series and connected together, and fins interposed between and engaging edge portions of said sections, said sections each being composed of upper and lower plates whose edge portions are seamed upon each other and afford laterally extending seats for said fins, and said fins each being composed of a central strip and upper and lower strips angularly transversely corrugated to form at the corrugations vertical sides and flat upper and lower portions connecting said sides and engaging said sections, and said flat portions being less in transverse length than said sides.

Signed at New York city, in the county of New York and State of New York, this 22nd day of March A. D. 1913.

ANTHONY UHLYARIK.

Witnesses:
ARTHUR MARION,
CHAS. C. GILL.